(12) United States Patent
Dutta et al.

(10) Patent No.: US 9,264,361 B2
(45) Date of Patent: Feb. 16, 2016

(54) SYSTEM AND METHOD FOR IMPLEMENTING MULTIPLE LABEL DISTRIBUTION PROTOCOL (LDP) INSTANCES IN A NETWORK NODE

(71) Applicants: Pranjal K Dutta, Sunnyvale, CA (US); Mustapha Aissaoui, Ottawa (CA)

(72) Inventors: Pranjal K Dutta, Sunnyvale, CA (US); Mustapha Aissaoui, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 322 days.

(21) Appl. No.: 13/857,110

(22) Filed: Apr. 4, 2013

(65) Prior Publication Data

US 2013/0266012 A1 Oct. 10, 2013

Related U.S. Application Data

(60) Provisional application No. 61/620,279, filed on Apr. 4, 2012.

(51) Int. Cl.
*H04L 12/28* (2006.01)
*H04L 12/801* (2013.01)
*H04L 12/723* (2013.01)
*H04L 12/703* (2013.01)

(52) U.S. Cl.
CPC ............... *H04L 47/12* (2013.01); *H04L 45/28* (2013.01); *H04L 45/507* (2013.01)

(58) Field of Classification Search
None
See application file for complete search history.

(56) References Cited

U.S. PATENT DOCUMENTS

2006/0062218 A1* 3/2006 Sasagawa ................ 370/389

FOREIGN PATENT DOCUMENTS

JP 2002111725 A 4/2002

OTHER PUBLICATIONS

Andersson et al. "LDP Specification; rfc5036.txt", Oct. 1, 2007, XP015055108 ISSN: 0000-0003, submitted as prior art by the applicant.*
Jul. 10, 2013 The International Search Report and The Written Opinion of The International Searching Authority, or The Declaration in PCT/US2013/035340, Alcatel-Lucent USA Inc., Applicant, 12 pages.
Dutta M Aissaoui Alcatel-Lucent P: "Multiple LDP instances; draft-pdutta-mpls-multi-ldp-instance-00.txt", Multiple LDP Instances; draft-pdutta-mpls-multi-ldp-instance-00.txt, Internet Engineering Task Force, IETF; StandardWorkingDraft, Internet Society (ISOC) 4, Rue Des Falaises CH—1205 Geneva, Switzerland, Apr. 5, 2012, pp. 1-11, XP015082306, [retrieved on Apr. 5, 2012].
Zhao Huwaei Technology L Fang C Zhou Cisco Systems L Li China Mobile N SO Q: "LDP Extensions for Multi Topology Routing; draft-ietf-mpls-ldp-multi-topology-03.txt", LDP Extensions for Multi Topology Routing; draft-ietf-mpls-ldp-multi-topology-03.txt, Internet Engineering Task Force, IETF; StandWorkingDraft, Internet Society (ISOC) 4, Rue Des Falaises CH—1205 Geneva, Switzerland, Mar. 12, 2012, pp. 1-18, XP015081854, [retrieved on Mar. 12, 2012].

(Continued)

*Primary Examiner* — Andrew Lai
*Assistant Examiner* — Jamaal Henson
(74) *Attorney, Agent, or Firm* — Wall & Tong, LLC

(57) ABSTRACT

A method and apparatus for implementing multiple Label Distribution Protocol (LDP) Label Switch Router (LSR) instances sharing a common data plane at a network element or node.

23 Claims, 6 Drawing Sheets

(56) References Cited

OTHER PUBLICATIONS

Rajiv Asati Cisco Vishwas Manral Hewlett-Packard et al; "Updates to LDP for IPv6; draft-ietf-mpls-ldp-ipv6-06.txt", Updates to LDP for IPv6; draft-ietf-mpls-ldp-ipv6-06.txt, Internet Engineering Task Force, IETF; StandardWorkingDraft, Internet Society (ISOC) 4, Rue Des Falaises CH—1205 Geneva, Switzerland, Jan. 24, 2012, pp. 1-17, XP015080321, [retrieved on Jan. 24, 2012].

"LDP Specification," IETF, Network Working Group, RFC: 5036, Oct. 2007.

Office Action received in corresponding Korean Application No. 2014-7027878, dated Apr. 8, 2015, pp. 1-11.

Japanese Office Action dated Oct. 6, 2015 in corresponding Japanese Application No. 2015-504736, total pp. 6.

Kouno, Miya, "Part 2 Label Switching Architecture," Network World, Japan, IDG Japan, Sep. 1, 2002, vol. 7 No. 9, pp. 162-166.

\* cited by examiner

SYSTEM AND METHOD FOR IMPLEMENTING MULTIPLE LABEL DISTRIBUTION PROTOCOL (LDP) INSTANCES IN A NETWORK NODE

CROSS-REFERENCE TO RELATED APPLICATION

This application claims the benefit of U.S. Provisional Patent Application Ser. No. 61/620,279, filed Apr. 4, 2012, entitled SYSTEM, METHOD AND APPARATUS FOR IMPROVED MPLS, which application is incorporated herein by reference in its entirety.

FIELD OF THE INVENTION

The invention relates to the field of communication networks such as multi-protocol label switching (MPLS) networks and, more particularly but not exclusively, to implementation of multiple LDP instances in a network element or node.

BACKGROUND

Multiprotocol Label Switching (MPLS) enables efficient delivery of a wide variety of differentiated, end-to-end services. The Internet Engineering Task Force (IETF) describes architecture for Multiprotocol Label Switching (MPLS) in its Request for Comment (RFC) document denoted as RFC 3031, and entitled "Multiprotocol Label Switching Architecture."

A fundamental concept in MPLS is that two Label Switching Routers (LSRs) must agree on the meaning of the labels used to forward traffic between and through them. This common understanding is achieved by using a set of procedures, called a label distribution protocol, by which one Label Switch Router (LSR) informs another of label bindings it has made.

SUMMARY

Various deficiencies in the prior art are addressed by methods and apparatus for hosting multiple Label Distribution Protocol (LDP) Label Switch Router (LSR) instances sharing a common data plane to provide various advantages such as data plane fate separation of LDP LSPs (Label Switch Paths).

One embodiment provides a method for hosting multiple Label Distribution Protocol (LDP) Label Switch Router (LSR) instances sharing a common data plane at a network element, the method comprising: instantiating within a memory at the network element a plurality of LSR instances, each LSR instance having associated with it a respective LSR Identifier (LSR ID); and mapping each LSR ID to a respective IP address from a pool of IP addresses associated with the common data plane at the network element; wherein each LSR instance is adapted to support a respective LDP session with a LSR at a peer network element.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
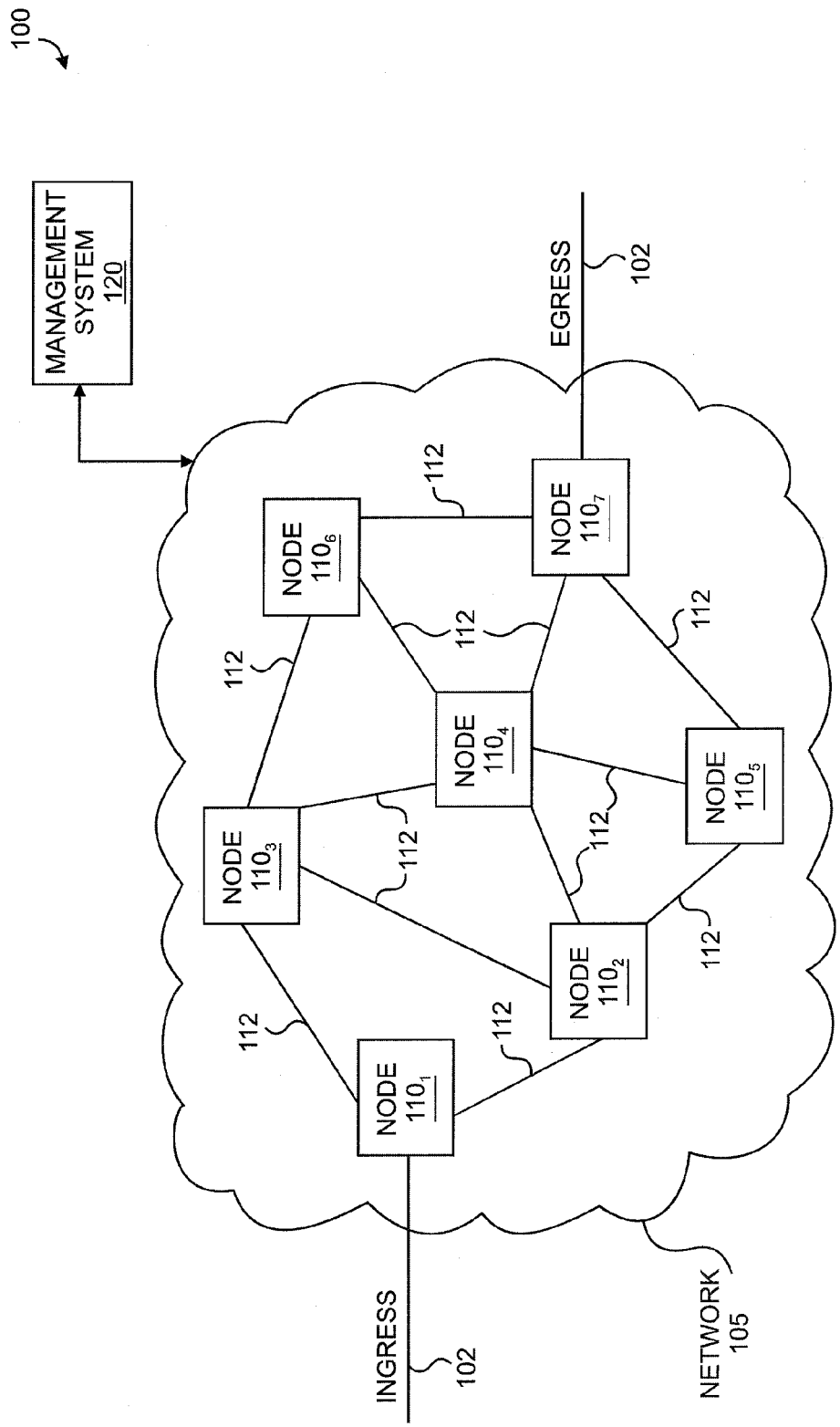
FIG. 1 depicts an exemplary network benefiting from the various embodiments.

Various embodiments will be described within the context of a network supporting Multi-Protocol Label switching, such as defined in IETF RFC3031 and RFC5036, each of which is herein incorporated by reference in its respective entirety.

Generally speaking, the embodiments herein described are directed toward the ability of an LDP network element or node to host multiple LSRs sharing the same (i.e., a common) data plane and same label space.

LDP (Label Distribution Protocol) is a signaling protocol for set up and maintenance of MPLS LSPs (Label Switched Paths), and for distributing labels for setting up LSPs. LDP comprises a set of procedures and messages by which Label Switch Routers (LSRs) establish Label Switched Paths (LSPs) through a network by mapping network-layer routing information directly to data-link layer switched paths, i.e., the LSPs. These LSPs may have an endpoint at a directly attached neighbor (comparable to IP hop-by-hop forwarding), an endpoint at a network egress node enabling thereby label switching via all intermediary nodes and the like.

LDP associates a Forwarding Equivalence Class (FEC) with each LSP it creates. The FEC associated with an LSP specifies which packets are "mapped" to that LSP. This FEC is the "context" of a label. LSPs are extended through a network as each LSR "splices" incoming labels for a FEC to the outgoing label assigned by the next hop for the given FEC.

A LDP LSR is identified by a LDP-ID which is combination of 4 byte LSR ID and 2 byte label space identifier. Usually a local IPv4 address in the system that is routable is mapped to the 4 byte LSR ID for operational simplicity. In that way uniqueness of the 4 byte LSR ID is also achieved across the network. If the label space ID is 0 then it means global/per platform label space where each local label programmed in data plane is unique across the system. If the label space ID is non-zero then it means per interface label space where each local label programmed in data plane is unique across an interface only. An example of such an interface is a label-controlled ATM interface that uses VCIs (Virtual Channel Identifiers) as labels, or a Frame Relay interface that uses DLCIs (Data Link Connection Identifiers) as labels.

Various methods provide for hosting multiple Label Distribution Protocol (LDP) Label Switch Router (LSR) instances sharing a common label space at a network element by, illustratively, instantiating within a memory at the network element a plurality of LSR instances, each LSR instance having associated with it a respective LSR Identifier (LSR ID) and a common label space identifier (label space ID), and mapping each LSR ID to a respective IP address at the network element. In this manner, each LSR instance is adapted to support a respective LDP session with a LSR at a peer network element.

In various embodiments, a single label space is supported at a single platform such as a network element or node, such as a single, default or global (i.e., platform-wide) label space. In this case, the single provided label space is typically associated with a label space identifier of 0 (zero). Thus, each of a plurality of LSR instances is part of a single group of LSR instances that is associated with a single or global label space (i.e., label space ID=0).

In various embodiments, multiple different label spaces are supported at a single platform such as a network element or node. In this case, multiple label spaces having different label space identifiers (e.g., 1, 2, 3 and so on) are available for use by the various embodiments. Thus, multiple groups of LSR instances may be provided, where each group of LSR instances includes a plurality of group member LSR instances, and each group of LSR instances is associated with a respective label space having associated with it a respective label space identifier.

Thus, in various embodiments, a network element may be associated with a plurality of instantiated LSRs within a single common label space. In other embodiments, the network element may be associated with multiple groups of instantiated LSRs, where a plurality of instantiated LSRs within each group shares a common or group label space.

Two neighboring LSR nodes maintain UDP based Hello Adjacencies and a TCP based Session. The Link level Hello Adjacencies determine the links over which directly peering LSR wants to send/receive traffic over LSPs. The Targeted Hello Adjacencies can be multi-hop away in a network and forms a multi-hop LDP session between non-directly connected LDP LSRs. The LDP Session is the channel through which all labels and various signaling parameters are exchanged (e.g., Label Mappings) with respect to various FECs.

A single platform can create multiple LSRs based on different label space identifiers—for implementations such as Per Interface Specific Label Space, etc. However, in such a case the data plane in every interface is isolated from other interfaces.

A single platform can create multiple LSRs when each LSR is virtualized for cases such as Carrier in Carrier where each virtual LDP LSR would have its own virtual data plane. Each LSR is treated as completely independent from each other and thus can have global label space ID (=0) separated by different router IDs.

Various embodiments are directed toward arrangements where multiple LSRs are required in a platform while sharing the same data plane and global label. The ability to host multiple LSRs sharing the same data plane solves several operational problems in LDP based MPLS networks.

FIG. 1 depicts a high-level block diagram of a communication network benefiting from various embodiments. Specifically, the communication network 100 of FIG. 1 includes a plurality of nodes $110_1$-$110_7$ (collectively, nodes 110). Nodes 110 support various combinations of network interfaces (NIs) 112 and/or external interfaces (EIs) 102. Nodes 110 communicate with external devices (e.g., nodes of other network domains, user devices, and the like) using EIs 102. NIs 112 may include network links. EIs 102 may include external links.

Nodes 110 include communication nodes supporting packet-based communications. In one embodiment, nodes 110 include communication nodes supporting any communication technologies supporting multicast capabilities, such as Internet Protocol (IP), Multiprotocol Label Switching (MPLS), Ethernet, and the like, as well as various combinations thereof. The NIs 112 and EIs 102 include interfaces supporting any communication technologies supported by associated nodes 110.

Although primarily depicted and described herein with respect to a communication network having specific types, numbers, and configurations of nodes 110, NIs 112, and EIs 102, the present embodiments may be implemented in communication networks having various other types, numbers, and configurations of nodes 110, NIs 112, and EIs 102. Similarly, although primarily depicted and described herein with respect to specific multicast communication technologies, the present embodiments may be implemented using various other unicast communication technologies, multicast communication technologies, and the like, as well as various combinations thereof.

The network may be modified by those skilled in the art to use other MPLS related protocols rather than the exemplary protocol discussed herein.

Network 100 includes an IP/MPLS communication network (CN) 105 and at least one network management system (NMS) 120 operative to, illustratively, route traffic between an originating LSR node 110-1 and a destination LSR node 110-7 via one or more label switched paths (LSPs) 112.

As depicted, NMS 120 is operative to control a plurality of routers 110 forming CN 105; namely, a plurality of Label Switched Routers (LSRs) 110-1 through 110-7. It will be noted that while only seven LSRs are depicted, CN 105 may include many more LSRs. The representation of CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs) not shown for simplification purposes, and the like, as well as various combinations thereof).

The NMS 120 may be implemented at a network node, network operations center (NOC) or any other location capable of communication with CN 105 and various elements related thereto. NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 6.

NMS 120 and the various routers 110 operate to support data plane fate separation of LDP LSPs. The Multi-Protocol Label Switching (MPLS) architecture is described in RFC3031 in IETF (Internet Engineering Task Force).

As depicted in FIG. 1, a traffic stream (e.g., a video or other data stream) is communicated from a source node, illustratively, LSR 110-1 to a destination node, illustratively, LSR 110-7 via one or more Label Switched Paths (LSPs) through various intermediate nodes 110. For example, a first LSP may originate at source node 110-1 and pass through node 110-3 and terminate at node 110-6 with Edge LSR 110-7 being the destination node. Similarly, a second LSP may originate at source node 110-1 and pass through node 110-2 and terminate at node 110-5 with Edge LSR 110-7 being the destination node.

The various embodiments described herein provide systems, methods, mechanisms and apparatus supporting the hosting and operation of multiple Label Distribution Protocol (LDP) Label Switch Router (LSR) instances sharing a common data plane at one or more network elements or nodes. In particular, the above described embodiments provide for instantiating within a memory at the network element a plurality of LSR instances, where each LSR instance having associated with it a respective LSR Identifier (LSR ID), and for mapping each LSR ID to a respective IP address from a pool of IP addresses associated with the common data plane at the network element. Each LSR instance is adapted to support a respective LDP session with a LSR at a peer network element.

Various embodiments provide for initiating LDP discovery for at least one of the plurality of LSR instances to discover thereby neighboring LSRs at one or more peer network elements or nodes, initiating LDP session establishment for one or more discovered LSRs for at least one of the plurality of LSR instances to establish thereby one or more respective LDP sessions, and initiating LDP label advertisement for one or more established LDP sessions for at least one of the plurality of LSR instances to advertise thereby one or more respective LDP labels.

Various embodiments provide for performing these steps at each of a plurality of peer network elements or nodes such that each peer network element or node supports one or more LSR instances adapted to support LDP sessions with LSR instances of other peer network elements or nodes. The various network elements or nodes may advertise a multiple LSR hosting capability to other peer network elements. Those network elements or nodes capable of hosting multiple LSR instances may advertise that multiple LSR hosting capability to other peer network elements, such as via a LDP Node-ID TLV that uniquely identifies the advertising network element. The LDP Node-ID TLV may be carried within an Optional Parameter portion of a Hello Message.

Various embodiments provide that an instantiated LSR at a network element or node may, in response to receiving via a peering session a FEC label mapping matching a FEC label mapping already received by another instantiated LSR at the network element, transmit a Label Release message via the peering session with a status code indicative of a detected loop condition. In this manner a loop condition may be avoided.

Various embodiments provide that each instantiated LSR of a network element or node may use a Hello Message including one or more parameters common to each of the instantiated LSRs of the network element. The common parameters of each Hello Message include an identifier of the network element.

Various embodiments provide that each of a plurality of instantiated LSRs at the network element or node may be used to transport traffic of a respective FEC type to a corresponding LSR instantiated at a peer network element. The FEC types comprise any of an IPv4 FEC Element Type, an IPv6 Element Type, a Unicast Element Type, a Multicast Element Type, a PseudoWire Element Type, a MultiCast PseudoWire Element Type or other type.

Various embodiments provide that at least a portion of the plurality of instantiated LSRs at the network element or node communicates with a corresponding a corresponding LSR instantiated at a peer network element to provide thereby a plurality of peering sessions, each peering session using a respective Transport Communication Protocol (TCP) address. Instantiated LSRs at a network element or node and at a peer network element or node generally use the same label space, and FEC label mappings exchanged via LDP sessions are generally disjoint sets.

Figure 2A:
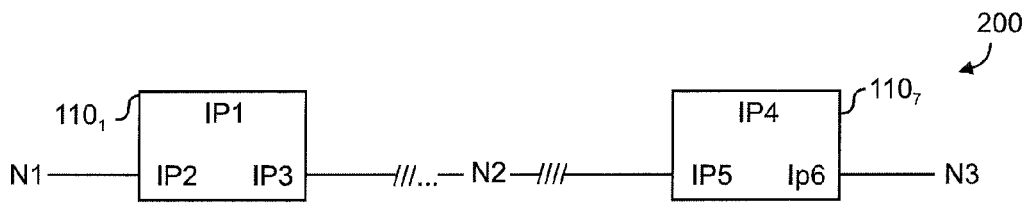
FIG. 2A depicts an exemplary arrangement of Multi-Instance OSPF (Open Shortest Path First) and LDP according to one embodiment.

FIG. 2A depicts an exemplary arrangement of Multi-Instance OSPF (Open Shortest Path First) and LDP according to one embodiment. Various embodiments provide for Multi-Instance OSPF and LDP arrangements.

In one embodiment, illustratively, a network is configured to use multiple OSPF instances requiring that LDP LSR IDs be mapped to, illustratively, OSPF router-IDs (or IS-IS Router IDs or similar) to establish targeted LDP Hello Adjacencies. In such embodiment, each network segment advertises the IPv4 address mapped to OSPF router-ID in that segment and does not leak the router-IDs from other segments. As a result, multiple LDP LSRs are instantiated in the same node sharing the same data plane. Consequently, network operators have the ability to separate segments of the underlying IP network into different Internet Routing Instances in IGPs (Interior Gateway Protocols) such as OSPF (Open Shortest Path First) or ISIS (Intermediate System—Intermediate System). For example, in a multi-instance OSPF where each OSPF Instance is identified by separate 4 byte OSPF router-IDs, a single platform can terminate multiple of such instances for each such network segment.

Other embodiments provide LSP as LDP over IGP shortcut over TE (Traffic Engineered) Tunnels where a LDP LSP further rides a TE (Traffic Engineered) MPLS tunnel denoted LSP Hierarchy. The LDP peering is targeted and LDP label is carried over the TE Tunnel, which is switched across each intermediate routing nodes. The TE tunnel can provide resilience to LDP LSP traffic when intermediate node or a link fails.

As depicted in FIG. 2A, two targeted LDP peering nodes (i.e., node 110₁ and 110₇) are indirectly connected. The LDP LSR in Node-110₁ is using IP1 as the LSR ID and LDP LSR in Node-110₇ is using IP4 as the router-ID. However, there are three separate instances of OSPF running across each network segment N1, N2 and N3 respectively. Those instances have mapped IP2 and IP3 as router-IDs in Node-110₁, towards N1 and N2 respectively. Node-110₇ has mapped IP5 and IP6 as router-IDs towards N2 and N3 respectively. Due to security reasons, the operator decided not to advertise IP1 and IP4 into any of the network segments. Thus, IP2 is advertised only to network N1; IP3 is advertised only to network N2; IP5 is advertised only to network N2 and IP6 is advertised only to network N3.

In such a case, LDP Hello Adjacency cannot be formed across the network by mapping LSR IDs to IP1 and IP4 respectively. IP1 and IP4 may be retained as LSR IDs by using IP2, IP3, IP5, IP6 as transport addresses, but that does not work in various LDP based applications. There are various applications such as LDP based Virtual Private LAN Service (VPLS) using BGP auto discovery or LDP based dynamic multi-segment pseudo wires (MS-PW) where IP2, IP3, IP5, IP6 can be BGP next-hops and as a result targeted LDP adjacencies need to be "auto-created" to BGP next-hops. Operators always use a common IP address mapped to OSPF Router-ID, LDP LSR ID, BGP next-hop, cross referencing for OAM (Operations, Administration and Maintenance) in "seamless" MPLS networks.

In order to form targeted LDP hello adjacency across networks N1, N2, N3 and be able to set-up seamless LDP LSP Over IGP shortcuts across those networks, LDP assigns multiple LSR IDs as follows:

In Node $110_1$:
IP2 as LSR ID while communicating with any peers in network N1.
IP3 as LSR ID while communicating with any peers in network N2.

In Node $110_7$:
IP5 as LSR ID while communicating with any peers in Network N2.
IP6 as LSR ID while communicating with any peers in Network N3.

All the LSRs in Node-$110_1$ and Node-$110_7$ need to be in the same label space, because the LDP LSP over IGP shortcut needs to be seamless across N1, N2, N3. Thus, the same data-plane in each system is shared.

Figure 2B:
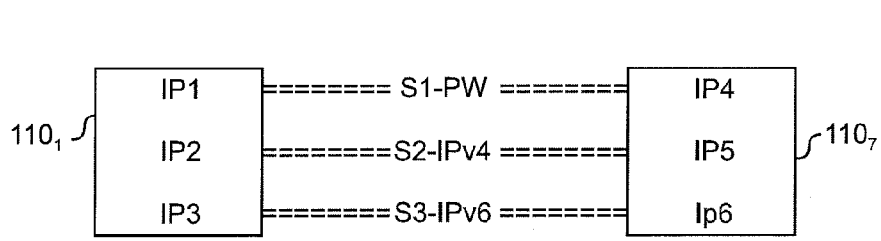
FIG. 2B depicts an exemplary arrangement of Fate Separation of various LDP LSP Types according to various embodiments.

FIG. 2B depicts an exemplary arrangement of Fate Separation of various LDP LSP Types according to various embodiments.

LDP is the default protocol for Pseudo wire (PW) set-up and Maintenance Protocol as per RFC 4447 defined in IETF. The base LDP specification in RFC 5036 defines the transport LSP (IPV4 or IPV6) capabilities.

In one embodiment, the signaling of PWs is separated from the transport LSPs to avoid head of the line blocking of one types with another that happens when exchanged over a single session. Such separation can be achieved if labels of each type are exchanged over separate sessions between same platforms. Similarly, operators may want fate separation of IPV4 and IPV6 LSPs, which requires separation of sessions with same peer yet shares the same data plane. Fate separation of IPV4 and IPV6 is a key issue with operators in general that deploy dual IP stack networks.

As depicted in FIG. 2B, Node-$110_1$ and Node-$110_7$ are running three peering sessions for fate separation of IPV4, IPV6 and PW LSPs, while sharing the same label space/data plane; namely, S1—Session, which is used for distribution of PW labels only;
S2—Session, which is used for distribution of IPV4 labels only; and
S3—Session, which is used for distribution of IPV6 labels only.

In order to establish such parallel fate-separated LDP sessions between two nodes, a different LSR ID is used for each session initiated by a node. The resulting configuration is then backward compatible with LDP session set-up procedures such as described in RFC 5036.

Further, in various VPLS (Virtual Private LAN Service) embodiments using such control plane separation, it is noted that all such fate separated sessions are terminated in the same remote platform or node. As a result, the applications may perform loop detection and take subsequent actions because parallel sessions involving applications performed by the same peering node may create loops if all multiple of these sessions are used to distribute the same set of labels by the peering node.

Fate-separation requires multiple LDP instances arrangement allowing for simultaneous backward compatibility compliance with RFC 5036 procedures. Such a solution is more commercially viable as it can be configured on existing LDP implementations.

The various embodiments provide, illustratively, a method to (1) implement multiple LSRs that share the same data plane and perform loop detection for applications that are configured in such a set-up; (2) implement multiple LDP LSRs in same platform or network node using a single common label space; and (3) implement groups of multiple LDP LSRs in the same platform or network node using a respective comment label space for each group. These configurations allow fate separation of various LSP types as well as segmentation of LDP network as per multi-instance IGP topology.

As used herein, the terms "LSR instance" and "LDP instance" are generally used herein to indicate an LSR instantiated at a network element or node in communication with, illustratively, an LSR instantiated at a peer network element or node wherein an LDP session is established therebetween.

A Multiple LDP instances configuration is a single-point solution that addresses both network segmentation and fate-separation requirements from network operators.

Figure 2C:
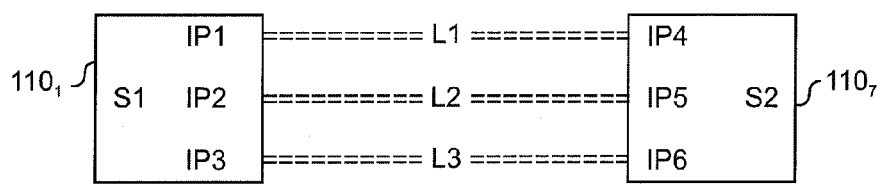
FIG. 2C depicts an exemplary LDP Node ID TLV encoded per standard LDP TLV format according to the various embodiments.

FIG. 2C depicts an exemplary Multiple LDP LSR implementing the various embodiments. Specifically, Multiple LDP LSRs are implemented in the same platform that shares a common data plane. As depicted in FIG. 2C, node $110_1$ and node $110_7$ implement a multiple LDP LSRs configuration in the same platform that shares a common data plane. Parallel LDP sessions are established between the two peering platforms for fate separation of various LSP types. As shown, there are three parallel links between node $110_1$ and node $110_7$ namely, L1, L2, L3. Node $110_1$ is configured with multiple LSRs that are mapped to IP addresses IP1, IP2 and IP3 respectively and node $110_7$ is configured with multiple LSRs that are mapped to IP addresses IP4, IP5 and IP6 respectively resulting in the following adjacencies: (1) Node $110_1$ forms hello adjacency with Node $110_7$ over link L1 using IP1 as LSR ID; (2) Node $110_7$ forms hello adjacency with Node $110_1$ over link L1 using IP4 as LSR ID; (3) Node $110_1$ forms hello adjacency with Node $110_7$ over link L2 using IP2 as LSR ID; (4) Node $110_7$ forms hello adjacency with Node $110_1$ over link L2 using IP5 as LSR ID; (5) Node $110_1$ forms hello adjacency with Node $110_7$ over link L3 using IP3 as LSR ID; and (6) Node $110_7$ forms hello adjacency with Node $110_1$ over link L3 using IP6 as LSR ID.

Three LDP sessions are formed between Node $110_1$ and $110_7$ with the above set of adjacencies as listed below:
Session 1=LDP session between IP1 and IP4;
Session 2=LDP session between IP2 and IP5; and
Session 3=LDP session between IP3 and IP6.

The labels distributed over all the sessions allocate labels from same label space and thus would share the data plane. Each peering session uses separate TCP transport address.

The FEC label mappings exchanged over each peering session are disjoint sets. RFC 5561 describes LDP Capabilities based on which various FEC Type Capabilities that can be exchanged while setting up parallel LDP sessions for disjoint FEC types.

While parallel multi-instance LDP sessions are running between two peering nodes, it is important to detect that such sessions involve the same peer node. If a node receives the same FEC Label Mapping from parallel multi-LSR peering sessions it may result in a loop for some applications. An example of such application can be LDP based Virtual Private LAN Service (VPLS). Thus, it is important to detect and prevent such loops. The embodiments herein described include a method for detection of multi-instance peering.

Figure 2D:
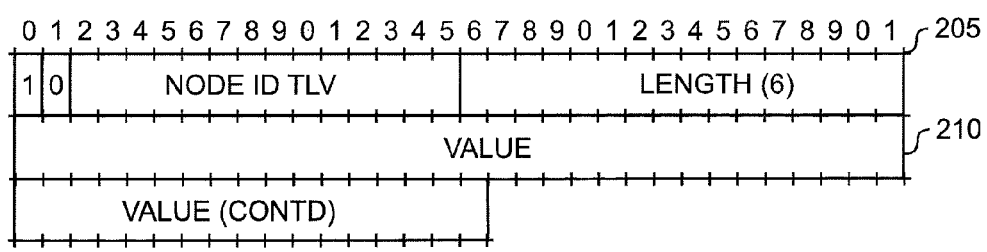
FIG. 2D depicts an exemplary LDP Node-ID TLV (Type Length Value) encoded per standard LDP TLV format according to one embodiment.

FIG. 2D depicts an exemplary LDP Node ID TLV encoded per standard LDP TLV format according to the various embodiments.

Various embodiments provide for field 208 shown as Node-ID Type to be standardized in IETF by a number available in LDP TLV registry in IANA. In other embodiments, Vendor Specific LDP TLV types as described in RFC 5036 are used. Value field 210 is a 48 bit identifier, which is a unique identifier across the network.

A node hosting multiple LDP instances advertises the same LDP Node-ID TLV in all Hello Messages originated by that node. In some embodiments, the value can be an IEEE Vendor specific MAC Address that can uniquely indentify a node in the network.

When an LSR receives a FEC label mapping from a peering session but same FEC mapping has been already received over another peering session associated with same Node-ID then the receiving LSR sends a Label Release to the peering session with status code "LOOP_DETECTED" as per RFC 5036.

Figure 2E:
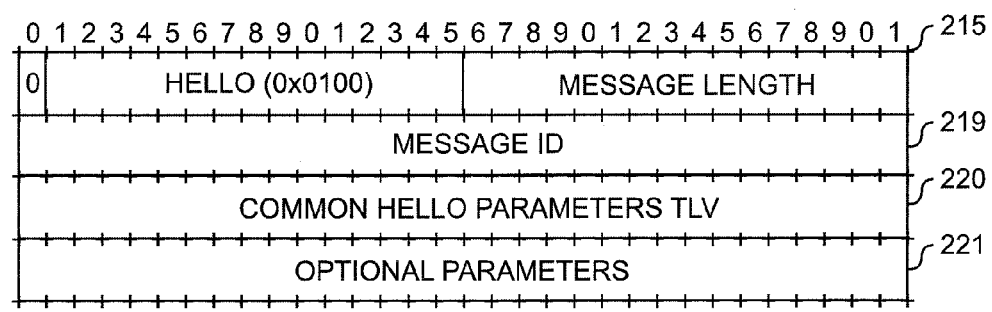
FIG. 2E depicts an exemplary LDP Hello Message encoded per RFC 5036 according to one embodiment.

FIG. 2E depicts an exemplary LDP Hello Message 215 encoded per RFC 5036 according to one embodiment. A field 219 contains the Message ID, which is a 32-bit value used to identify this message. A field 220 contains Common Hello Parameters TLV, which specifies parameters common to all Hello Messages, while a field 221 contains Optional Parameters of the Hello Mesage. The encoding for the Common Hello Parameters TLV is described in reference to FIG. 3A.

Figure 3A:
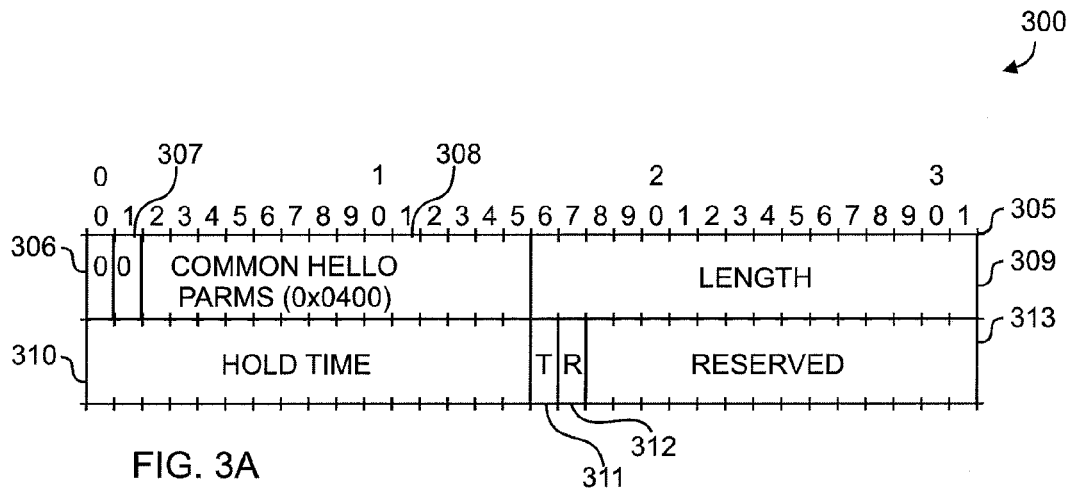
FIG. 3A depicts an exemplary Common Hello Parameters TLV encoded per standard LDP format according to one embodiment.

FIG. 3A depicts an exemplary Common Hello Parameters TLV 300 encoded per standard LDP format according to one embodiment.

Referring to FIG. 2C, node-$110_1$ sends out Hellos for all its LSRs with Node ID 51. Node-$110_7$ sends out hellos for all its LSRs with Node ID S2. These Hello messages are encoded according to the format depicted in FIG. 3A.

Field 310 contains Hello holds time in seconds. An LSR maintains a record of Hellos received from potential peers. Hello Hold Time specifies the time the sending LSR will maintain its record of Hellos from the receiving LSR without receipt of another Hello.

In some embodiments, a pair of LSRs settles on the hold times they use for Hellos from each other. Each proposes a hold time. The hold time used is the minimum of the hold times proposed in their Hellos. A value of 0 means use the default, which is 15 seconds for Link Hellos and 45 seconds for Targeted Hellos. A value of 0xffff means infinite.

Filed 311 denoted "T" refers to Targeted Hello. A value of 1 specifies that this Hello is a Targeted Hello. A value of 0 specifies that this Hello is a Link Hello.

Field 312 denoted "R," refers to Request Send Targeted Hellos. A value of 1 requests the receiver to send periodic Targeted Hellos to the source of this Hello. A value of 0 makes no request.

An LSR initiating Extended Discovery sets R to 1. If R is 1, the receiving LSR checks whether it has been configured to send Targeted Hellos to the Hello source in response to Hellos with this request. If the result of the test is negative, the node ignores the request. If the result of the test is affirmative, the node initiates periodic transmission of Targeted Hellos to the Hello source.

Field 313 denoted "Reserved" is reserved. It is set to zero on transmission and ignored on receipt.

Field 309 is optional. This variable length field of the Hello message contains 0 or more parameters, each encoded as a TLV. The optional parameters defined by this version of the protocol are as follows:

| Optional Parameter | Type | Length | Value |
| --- | --- | --- | --- |
| IPv4 Transport Address | 0x0401 | 4 | See below |
| Configuration Sequence Number | 0x0402 | 4 | See below |
| IPv6 Transport Address | 0x0403 | 16 | See below |

IPv4 Transport Address

Specifies the IPv4 address to be used for the sending LSR when opening the LDP session TCP connection. If this optional TLV is not present, the IPv4 source address for the UDP packet carrying the Hello is be used.

Configuration Sequence Number

Specifies a 4 octet unsigned configuration sequence number that identifies the configuration state of the sending LSR. Used by the receiving LSR to detect configuration changes on the sending LSR.

IPv6 Transport Address

Specifies the IPv6 address to be used for the sending LSR when opening the LDP session TCP connection. If this optional TLV is not present the IPv6 source address for the UDP packet carrying the Hello would be used.

Figure 3B:
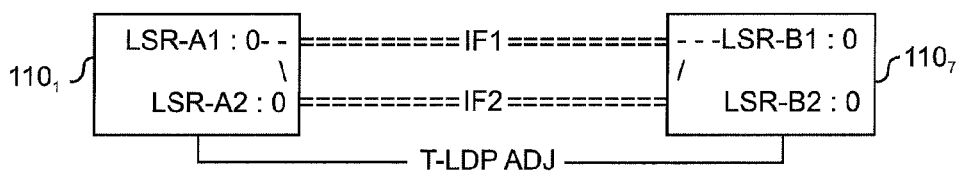
FIG. 3B depicts an exemplary arrangement providing Fate Separation of FECs exchanged between nodes in two separate groups according to one embodiment.

FIG. 3B depicts an exemplary arrangement of Fate Separation of FECs Exchanged between nodes in two separate groups according to one embodiment. Specifically, an operator wants to separate the fate of FECs exchanged between the nodes into two separate groups. In some embodiments, Group 1 contains all "transport" specific FEC types such as IPV4 FEC Element Type and LDP Multi-point (MP) FEC types, etc. LDP Multi-point FEC types are described in RFC6388. Group 2 contains various Pseudowire (PW) FEC types.

Two separate LSR IDs are provisioned in each node (i.e., two separate LSRs are instantiated at each node)—one LSR is dedicated for FEC Group 1 and another for FEC Group 2.

There are two parallel interfaces between $110_1$ and $110_7$ as IF1 and IF2 respectively. The traffic for LSPs set-up for FEC Group 1 may use both IF1 and IF2. Thus, both IF1 and IF2 would exchange Hello Packets using LSR-A1:0 and LSR-A2:0 respectively for setting up Hello adjacency for the LDP instance assigned for FEC Group 1.

The Hello messages exchanged over IF1 and IF2 may carry the LDP Adjacency Capabilities for each FEC Types in a specific FEC Group. There are no LDP adjacency capabilities thus far, but existing LDP capabilities in RFC 5561 can be extended to implement LDP Hello Adjacency Capabilities. In such a case, LDP Hello Messages would also carry LDP capability information. The Hello exchanges would result in formation of a LDP session between two nodes $110_1$ and $110_7$ for the instance indentified by LSR-A1:0 and LSR-B1:0 respectively. The LDP session would be set-up with Capabilities of FEC Group 1.

A Targeted LDP (T-LDP) hello adjacency would be formed between $110_1$ and $110_7$ using LSR-A2:0 and LSR-B2:0 respectively. The T-LDP Hello Messages exchanged between the nodes carry the LDP Adjacency Capabilities for each FEC Types in FEC Group 2 result in a LDP session between $110_1$ and $110_7$ for the instance identified by LSR-A2:0 and LSR-B2:0 respectively. The LDP session may be set up with capabilities of FEC Group 2.

Figure 3C:
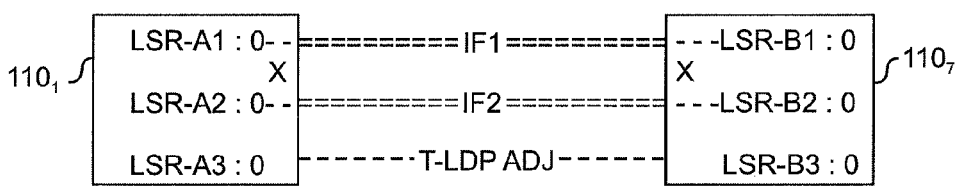
FIG. 3C depicts an exemplary arrangement of Fate Separation of IPv4 FEC (Forward Equivalency Class) Element Type and MP FEC Element Types into Unicast and Multicast Groups according to one embodiment.

FIG. 3C depicts an exemplary arrangement of Fate Separation of IPv4 FEC (Forward Equivalency Class) Element Type and MP FEC Element Types into Unicast and Multicast Groups according to one embodiment. Specifically, an operator may choose to further separate the fate of IPV4 FEC Element Type and MP FEC Element types into "Unicast" and "Multicast" Groups. In this embodiment, there are three FEC Groups and fate separation is required for all three FEC Groups.

FEC Group 1: IPv4 FEC Element Type;
FEC Group 2: MP FEC Element Types; and
FEC Group 3: PW FEC Element Types.
LDP Instance 1: The LDP instance with peering LSR-A1:0 and LSR-B1:0 are assigned for FEC Group 1;
LDP Instance 2: The LDP Instance with peering LSR-A2:0 and LSR-B2:0 are assigned for FEC Group 2; and
LDP Instance 3: The LDP instance with peering LSR-A3:0 and LSR-B3:0 are assigned for FEC Group 3.
In this embodiment, both IF1 and IF2 are associated with LDP instances 1 and 2. Each of IF1 and IF2 would originate two separate Hello Messages using the same source IP address, one Hello Message for each instance. This arrangement results in two hello adjacencies per interface—one for Instance 1 and Instance 2. Each Hello Adjacencies would advertise capabilities using rules described above.

Other embodiments provide for an operator who wants to do fate separation of IPV4 and IPV6 LDP based LSPs, but IF1 and IF2 are single stack interfaces only—that is either IPV4 or IPV6. Thus, the operator may provision single stack interfaces IF1 and IF2 and yet also provision fate separation of IPV4 and IPV6 LSPs. The T-LDP Hello Adjacency would be formed for LDP Instance 3 using the PW Capabilities.

Figure 3D:
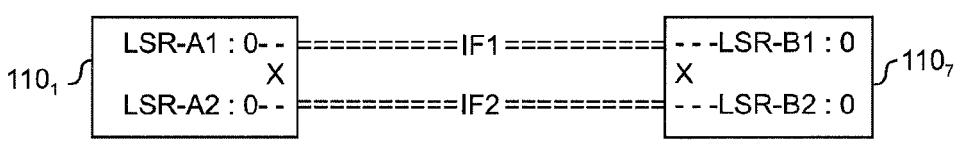
FIG. 3D depicts an exemplary arrangement of Fate Separation of dual-stack IPv4 and IPv6 LSPs according to one embodiment.

FIG. 3D depicts an exemplary arrangement of Fate Separation of dual-stack IPv4 and IPv6 LSPs according to one embodiment. In this embodiment, both interfaces IF1 and IF2 are dual-stack (IPV4 and IPV6) interfaces and the operator wants fate separation of IPV4 and IPV6 LSPs. Illustratively, IPv4 or IPv6 FECs may include all FEC types that are associated with IPV4 or IPV6. For example, there are several in-band MP FEC Types that may be classified into IPV6. The instances formed in this embodiment are as follow.

LDP Instance 1: The LDP instance with peering LSR-A1:0 and LSR-B1:0 are assigned for IPV4 FEC Types; and
LDP Instance 2: The LDP Instance with peering LSR-A2:0 and LSR-B2:0 are assigned for IPV6 FEC Types.
Both the interfaces IF1 and IF2 are associated with each of the LDP instances 1 and 2 respectively. In this embodiment, the operator may choose to use IPv4 addresses on the interfaces for sending Hello Messages for Instance 1 and IPv6 addresses on the interfaces for sending Hello Messages for Instance 2.

In other embodiments, IF1 is dedicated for IPV4 LSPs and IF2 is dedicated for IPV6 LSPs. This provides fate-separation for both control plane as well as data plane.

Implementation of LDP Address Distribution

An LSR maintains learned labels in a Label Information Base (LIB). When operating in Downstream Unsolicited mode, the LIB entry for an address prefix associates a collection of (LDP Identifier, label) pairs with the prefix, one such pair for each peer advertising a label for the prefix. When the next hop for a prefix changes, the LSR retrieves the label advertised by the new next hop from the LIB for use in forwarding packets. To retrieve the label, the LSR maps the next hop address for the prefix to an LDP Identifier. Similarly, when the LSR learns a label for a prefix from an LDP peer, it determines whether that peer is currently a next hop for the prefix to determine whether it needs to start using the newly learned label when forwarding packets that match the prefix. To make that decision, the LSR maps an LDP Identifier to the various peers addresses to check whether any of them are a next hop for the prefix. To enable LSRs to map between a peer LDP Identifier and the peer's addresses, LSRs advertise its addresses using LDP Address and Withdraw Address messages as per procedures defined in RFC5036.

However, while running multi-instance LDP peering between two nodes, it is possible that all such sessions may distribute same set of local addresses in each node. Various embodiments segregate the local address space in each node among the multiple LDP instances to avoid duplication of address distribution. Other embodiments do not implement this feature.

Figure 4:
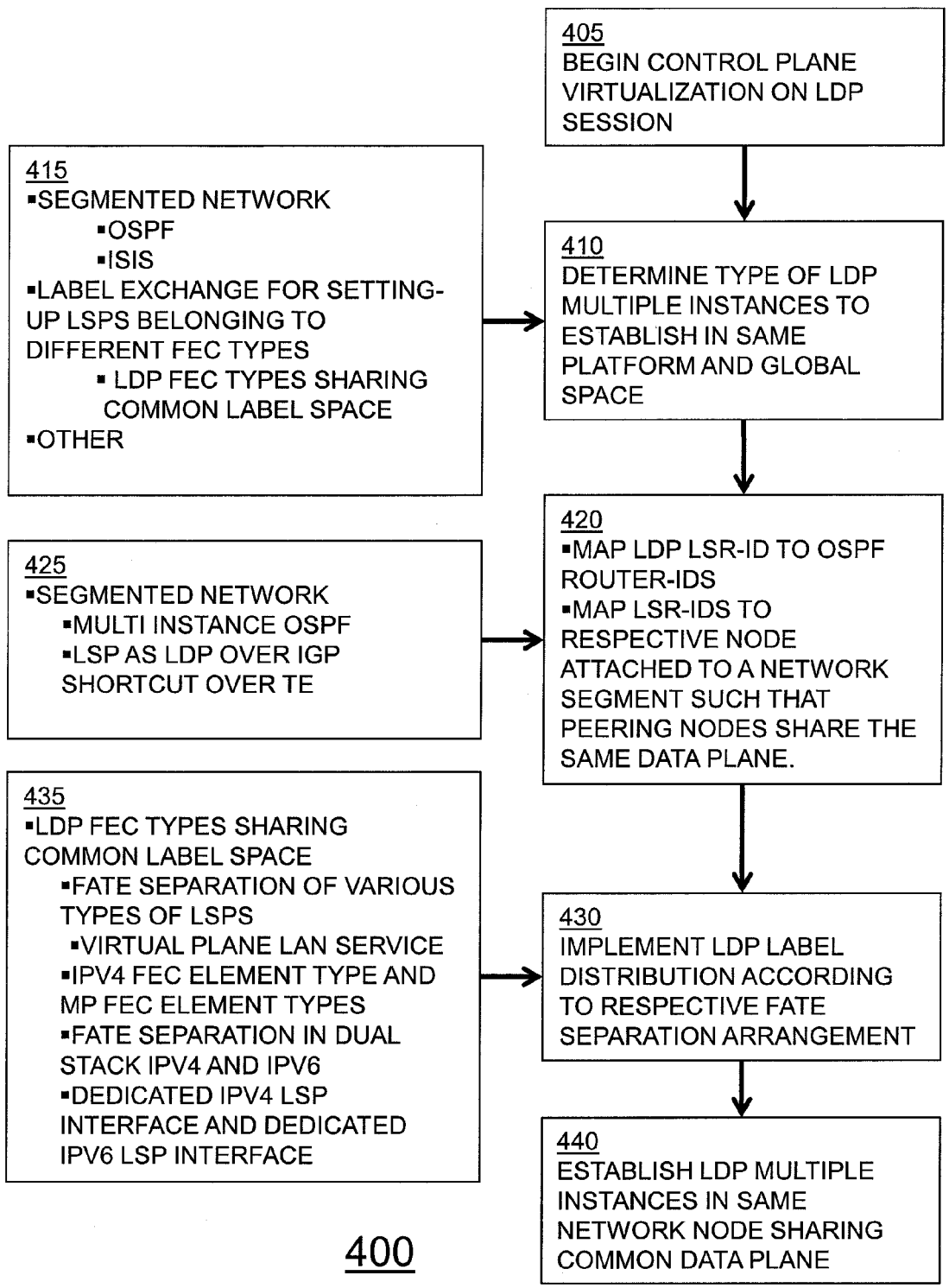
FIG. 4 depicts a flow diagram of a method according to one embodiment.

FIG. 4 depicts a flow diagram of a method according to one embodiment. Generally speaking, method 400 provides a mechanism for LSRs to implement multiple LDP instances in a network node.

Method 400 begins at step 405 and proceeds to step 410, where a LSR determines the type of LDP Multiple instances to establish in a node. Referring to box 415, there are two major categories that lend to multiple LDP instances implementation namely, segmented network and Label Exchange for setting-up LSPs belonging to different FEC types.

In a segmented network, each network segment advertises the IPv4 address mapped to OSPF router-ID in that segment and does not leak the router-IDs from other segments. As a result, multiple LDP LSRs are instantiated in the same node sharing the same data plane. Consequently, network operators have the ability to separate segments of the underlying IP network into different Internet Routing Instances in IGPs (Interior Gateway Protocols) such as OSPF (Open Shortest Path First) or ISIS (Intermediate System—Intermediate System). For example, in a multi-instance OSPF where each OSPF Instance is indentified by separate 4 byte OSPF router-ids, a single platform can terminate multiple of such instances for each such network segment.

In the other category, the labels distributed over all the sessions are allocated from the same label space and thus share the data plane. Each peering session uses separate TCP transport address.

At step 420, having determined the type of LDP multiple instances to establish, LSR IDs are mapped such that peering nodes share the same data plane. Referring to box 425, LSR IDs are mapped according to characteristics such as whether or not the network is segmented, or a multi-instance OSPF is implemented or LSP as LDP over IGP shortcut over TE is implemented.

At step 430, LDP Label distribution is implemented according to respective fate separation arrangement previously determined. Referring to box 435, such fate separation arrangement includes fate separation of various types of LSPs, virtual plane LAN service, IPv4 FEC element type, MP FEC element types, fate separation in dual stack IPv4 and IPv6, dedicated IPv4 LSP interface, dedicated IPv6 LSP interface and the like.

At step 440, LDP multiple instances in the same network node sharing common data plane and global space is established.

Figure 5:
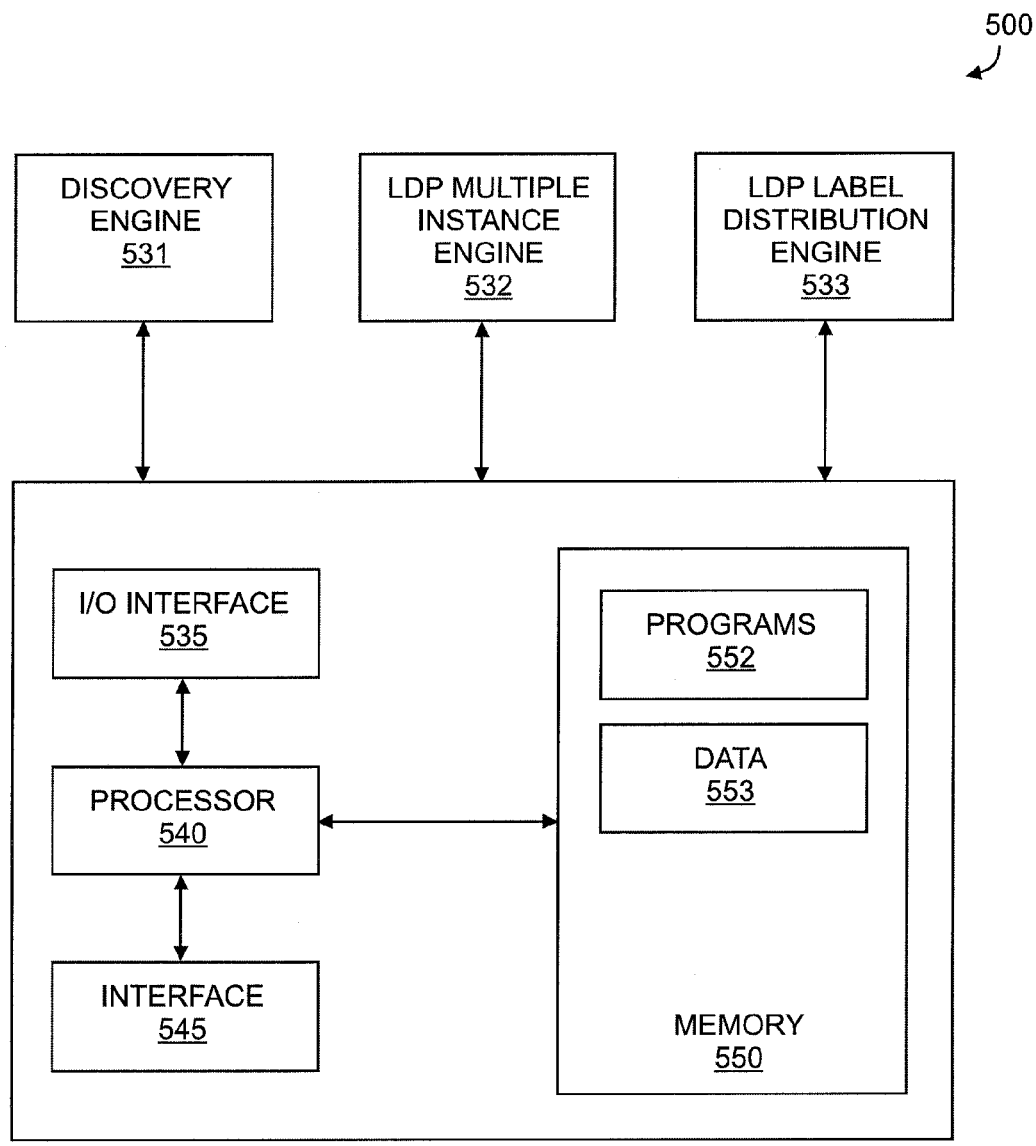
FIG. 5 depicts a high level block diagram of a control portion of an exemplary node suitable for implementing various embodiments.

FIG. 5 depicts a control portion 500 of an exemplary node suitable for implementing various embodiments, such as a control portion of LDP nodes 110. As depicted in FIG. 5, a node control portion 500 includes one or more processor(s) 540, a memory 550, an input/output (I/O) interface 535 and network interface 545.

The processor(s) 540 are adapted to cooperate with the memory 550, the network interface 545, the I/O interface 535 and the like to provide the various functions described herein with respect to the nodes 110. In various embodiments, the exemplary node control portion 500 may be implemented as described below with respect to the computing device of FIG. 6.

The memory 550, generally speaking, stores programs, data, tools and the like that are adapted for use in providing various control plane and data plane functions associated with the nodes 110. The memory 550 is depicted as storing programs 552 and data 553 useful in supporting the various control plane and data plane functions depicted and described herein. For example, memory 550 is depicted as storing programs 522 and data 523 adapted for use in providing various computing, routing, control and hosting functions within the MPLS communication system.

Also depicted in FIG. 5 is a Discovery Engine 531, LDP Multiple Instance Engine 532 and LDP Label Distribution Engine 533. These engines may be implemented as hardware or firmware modules external to the node control portion 500 described herein. In various embodiments, the engines may be partially or entirely via programs 552 executed within the node control portion 500 or nodes 110 described herein.

In various embodiments, the memory 550 includes programs and data associated with Discovery Engine 531, LDP Multiple Instance Engine 532 and/or LDP Label Distribution Engine 533. In various embodiments, Discovery Engine 531, LDP Multiple Instance Engine 532 and LDP Label Distribution Engine 533 are implemented using software instructions which may be executed by a processor (e.g., processor 535) for performing the various functions depicted and described herein.

I/O interface 535 and network interface 545 are adapted to facilitate communications with peripheral devices both internal and external to processor 540. For example, I/O interface 535 is adapted to interface with memory 550. Similarly, I/O interface 535 is adapted to facilitate communications with LDP node 110 Discovery Engine 531, LDP Multiple Instance Engine 532 and LDP Label Distribution Engine 533 and the like. In various embodiments, a connection is provided between processor ports and any peripheral devices used to communicate with the network (not shown).

Although primarily depicted and described with respect to a control portion 500 of a node 110 in communication with Discovery Engine 531, LDP Multiple Instance Engine 532 and LDP Label Distribution Engine 533, it will be appreciated that I/O interface 535 may be adapted to support communications with any other devices suitable for providing the various functions described herein.

Although depicted and described with respect to embodiments in which the Discovery Engine 531, LDP Multiple Instance Engine 532 and/or LDP Label Distribution Engine 533 are external and/or internal to the depicted node control portion 500, it will be appreciated by those skilled in the art that the engines may be stored in one or more other storage devices internal and/or external to LDP node 110 and/or node control portion 500 thereof. The engines may be distributed across any suitable numbers and/or types of storage devices internal and/or external to LDP node 110 and/or node control portion 400 thereof. Memory 550, including the engines of memory 550, is described in additional detail herein below.

In various embodiments, Discovery Engine 531 is adapted to determine the categories that lend to multiple LDP instances implementation namely, segmented network and Label Exchange for setting-up LSPs belonging to different FEC types as described above.

In various embodiments, LDP Multiple Instance Engine 532 is adapted to map LSR IDs to respective node such that peering nodes share the same data plane and global space to thereby establish LDP multiple instances as described above.

In various embodiments, LDP Label Distribution Engine 533 is adapted to perform label distribution according to determined fate separation arrangement.

Figure 6:
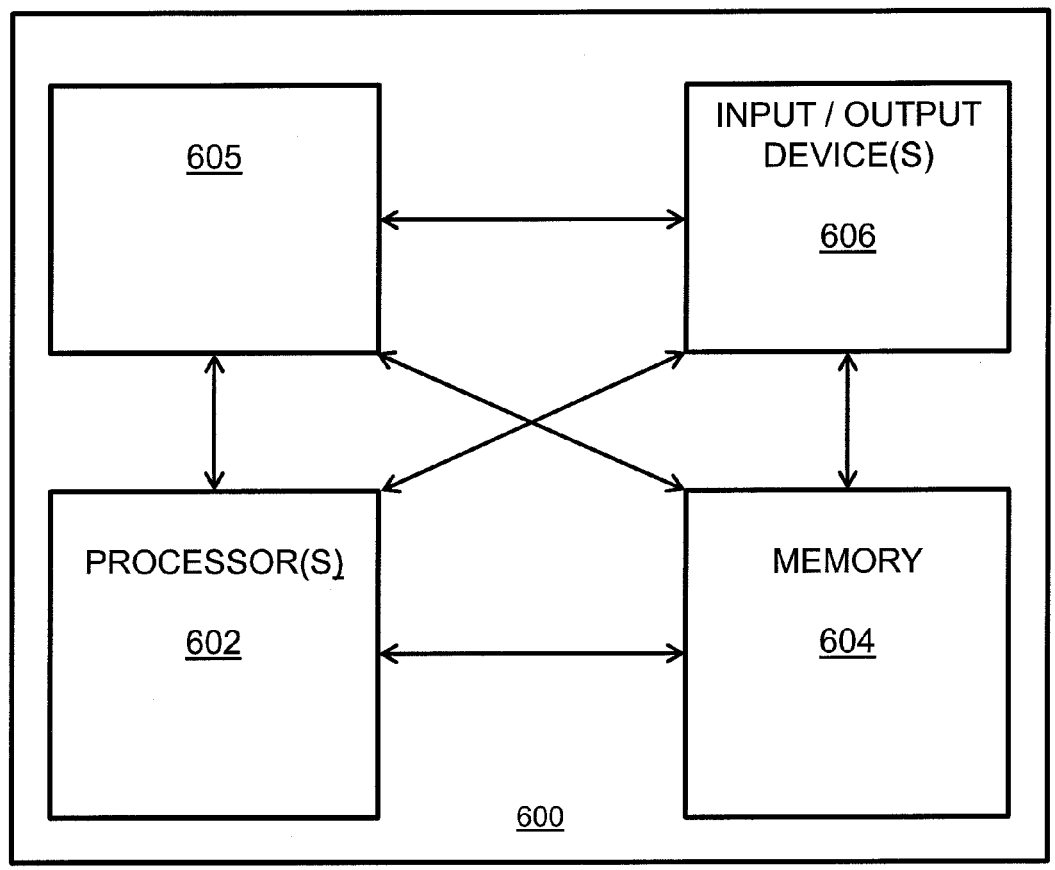
FIG. 6 depicts a high-level block diagram of a computing device, such as a processor in a telecom network element, suitable for use in performing functions described herein.

FIG. 6 depicts a high-level block diagram of a computing device, such as a processor in a telecom network element, suitable for use in performing functions described herein such as those associated with the various elements described herein with respect to the figures.

As depicted in FIG. 6, computing device 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for hosting multiple Label Distribution Protocol (LDP) Label Switch Router (LSR) instances sharing a common label space at a network element, comprising:

instantiating within a memory at the network element a plurality of LSR instances, each LSR instance having associated with it a respective LSR Identifier (LSR ID) and a common label space identifier (label space ID); and mapping each LSR ID to a respective IP address at the network element;

wherein each LSR instance is adapted to support a respective LDP session with a LSR at a peer network element;

wherein said network element advertises a multiple LSR hosting capability to other peer network elements.

2. The method of claim 1, wherein said network element is associated with a plurality of different label spaces, said common label space comprising a first of said plurality of different label spaces.

3. The method of claim 2, further comprising repeating said steps of instantiating and mapping to provide thereby multiple LSR instances sharing a second of said plurality of different label spaces.

4. The method of claim 2, wherein each of said plurality of different label spaces has associated with it a respective multiple LSR instances.

5. The method of claim 1, wherein said mapping uses a respective IP address from a pool of IP addresses associated with the common label space.

6. The method of claim 1, further comprising initiating LDP discovery for at least one of said plurality of LSR instances to discover thereby neighboring LSRs at one or more peer network elements.

7. The method of claim 6, further comprising initiating LDP session establishment for one or more discovered LSRs for at least one of said plurality of LSR instances to establish thereby one or more respective LDP sessions.

8. The method of claim 7, further comprising initiating LDP label advertisement for one or more established LDP sessions for at least one of said plurality of LSR instances to advertise thereby one or more respective LDP labels.

9. The method of claim 1, wherein said steps are performed at each of a plurality of peer network elements such that each peer network element supports one or more LSR instances adapted to support LDP sessions with LSR instances of other peer network elements.

10. The method of claim 9, wherein each peer network element capable of hosting multiple LSR instances advertises said multiple LSR hosting capability to other peer network elements.

11. The method of claim 1, wherein said multiple LSR hosting capability is advertised via a LDP Node-ID TLV that uniquely identifies the advertising network element.

12. The method of claim 11, wherein said LDP Node-ID TLV is carried within an Optional Parameters field of a LDP Hello Message.

13. The method of claim 1, further comprising:
at an instantiated LSR at the network element, in response to receiving via a peering session a FEC label mapping matching a FEC label mapping already received by another instantiated LSR at the network element, transmitting a Label Release message via the peering session with a status code indicative of a detected loop condition.

14. The method of claim 1, wherein each instantiated LSR of a network element uses a Hello Message including one or more parameters common to each of the instantiated LSRs of the network element.

15. The method of claim 14, wherein said common parameters of each Hello Message include an identifier of the network element.

16. The method of claim 1, wherein each of a plurality of instantiated LSRs at the network element is used to transport traffic of a respective FEC type to a corresponding LSR instantiated at a peer network element.

17. The method of claim 16, wherein said FEC types comprise any of an IPv4 FEC Element Type, an IPv6 Element Type, a Unicast Element Type, a Multicast Element Type, a PseudoWire Element Type and a MultiCast PseudoWire Element Type.

18. The method of claim 1, wherein at least a portion of the plurality of instantiated LSRs at the network element communicates with a corresponding LSR instantiated at a peer network element to provide thereby a plurality of peering sessions, each peering session using a respective Transport Communication Protocol (TCP) address.

19. The method of claim 18, wherein FEC label mappings exchanged via LDP sessions are disjoint sets.

20. A telecom network element, for hosting multiple Label Distribution Protocol (LDP) Label Switch Router (LSR) instances sharing a common data plane at a network element, comprising a processor configured for:
instantiating within a memory at the network element a plurality of LSR instances, each LSR instance having associated with it a respective LSR Identifier (LSR ID); and
mapping each LSR ID to a respective IP address from a pool of IP addresses associated with the common data plane at the network element;
wherein each LSR instance is adapted to support a respective LDP session with a LSR at a peer network element;
wherein said network element advertises a multiple LSR hosting capability to other peer network elements.

21. A tangible and non-transient computer readable storage medium storing instructions which, when executed by a computer, adapt the operation of the computer to provide a method for hosting multiple Label Distribution Protocol (LDP) Label Switch Router (LSR) instances sharing a common data plane at a network element, the method comprising:
instantiating within a memory at the network element a plurality of LSR instances, each LSR instance having associated with it a respective LSR Identifier (LSR ID); and
mapping each LSR ID to a respective IP address from a pool of IP addresses associated with the common data plane at the network element;
wherein each LSR instance is adapted to support a respective LDP session with a LSR at a peer network element;
wherein said network element advertises a multiple LSR hosting capability to other peer network elements.

22. A computer program product storing computer instructions which, when executed by a processor in a telecom network element, adapt the operation of the telecom network element to provide a method for hosting multiple Label Distribution Protocol (LDP) Label Switch Router (LSR) instances sharing a common data plane at a network element, the method comprising:
instantiating within a memory at the network element a plurality of LSR instances, each LSR instance having associated with it a respective LSR Identifier (LSR ID); and
mapping each LSR ID to a respective IP address from a pool of IP addresses associated with the common data plane at the network element;
wherein each LSR instance is adapted to support a respective LDP session with a LSR at a peer network element;
wherein said network element advertises a multiple LSR hosting capability to other peer network elements.

23. A method for hosting multiple Label Distribution Protocol (LDP) Label Switch Router (LSR) instances sharing a common label space at a network element, comprising:

instantiating within a memory at the network element a plurality of LSR instances, each LSR instance having associated with it a respective LSR Identifier (LSR ID) and a common label space identifier (label space ID); and mapping each LSR ID to a respective IP address at the network element;

wherein each LSR instance is adapted to support a respective LDP session with a LSR at a peer network element; and advertising a multiple LSR hosting capability via a LDP Node-ID TLV that uniquely identifies the network element wherein said network element advertises a multiple LSR hosting capability to other peer network elements.

\* \* \* \* \*